A. P. BRUSH.
DIFFERENTIAL DRIVING MECHANISM.
APPLICATION FILED JAN. 13, 1917.
1,285,017.
Patented Nov. 19, 1918.
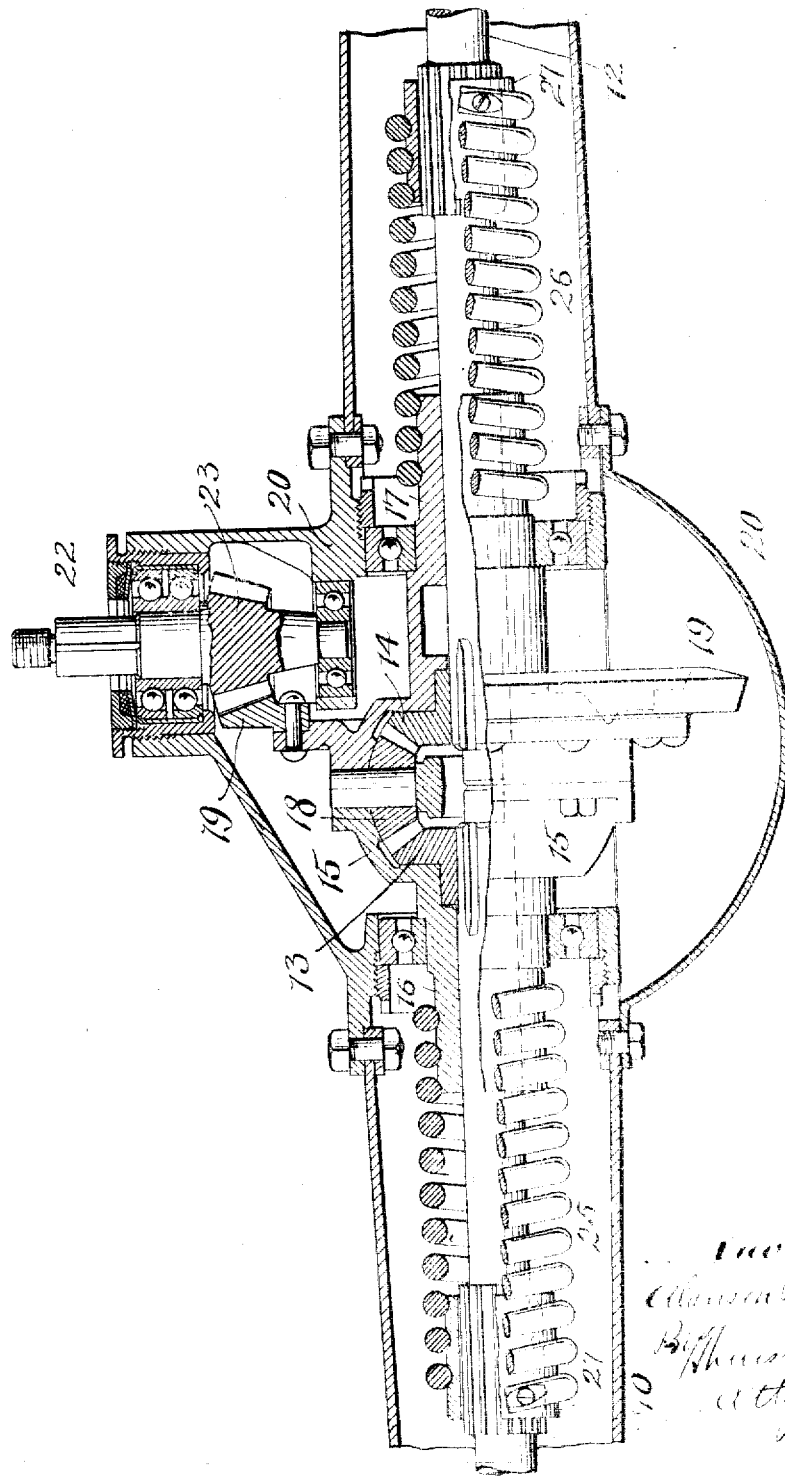

UNITED STATES PATENT OFFICE.

ALANSON P. BRUSH, OF DETROIT, MICHIGAN.

DIFFERENTIAL DRIVING MECHANISM.

1,285,017.

Specification of Letters Patent.

Patented Nov. 19, 1918.

Application filed January 18, 1917. Serial No. 142,128.

*To all whom it may concern:*

Be it known that I, ALANSON P. BRUSH, a citizen of the United States, residing at Detroit, in the county of Wayne and State of Michigan, have invented a certain new and useful Improvement in Differential Driving Mechanism, of which the following is a full, clear, and exact description.

The ordinary differential driving mechanism in common use on motor cars has desirable qualities and capacities which overbalance its deficiencies, or otherwise it would not be in general use. It is, however, well understood that it is defective, in that, under certain circumstances, the turning of the differential gear may result in turning one only of the two associated driven shafts. Such conditions may arise when one of the driving wheels is on a slippery surface on which it has no traction. In that event the turning of the differential gear will result in the turning of this particular wheel without turning the other wheel at all, although that other wheel may have sufficient traction to drive the car if it could be made to turn.

The object of this invention is to relieve the ordinary differential mechanism of the above noted defect, without in any material degree interfering with the performance of its usual beneficial functions. To this end the invention consists in the construction and combination of parts shown in the drawing and hereinafter described and pointed out definitely in the appended claims.

In the drawings, Figure 1 is a longitudinal central section of a common form of differential driving mechanism with the present invention applied thereto.

Referring to the parts by reference characters, 10 and 12 represent two alined driven shafts which are interconnected through differential gearing, of which 15 represents the rotatable differential drum, which is rotatably mounted to rotate about an axis which is coincident to the axis of the two alined shafts 10 and 12. In the specific construction shown this differential drum is formed with two oppositely extended elongated hubs 16 and 17 which are rotatably mounted in suitable anti-friction bearings upon the casing member 20. The two shafts 10 and 12 are independently rotatable within the hubs 16 and 17 respectively; and the beveled gears 13 and 14 which respectively have driving connections with the two shafts 10 and 12, are in mesh with the compensating pinions 18 rotatably mounted upon the differential drum. A ring gear 19 is fixed to this differential drum whereby the drum may be turned by the driving shaft 22 and the beveled gear 23 thereon. To the extent described this differential driving mechanism is of familiar well understood construction. Those familiar with this art will likewise understand that power will be transmitted respectively from the shafts 10 and 12 to the two driving wheels of the car through suitable mechanism, of which several varieties are in common use.

25 and 26 are two torsion coil springs which respectively surround the shafts 10 and 12. The spring 25 is connected at one end to the shaft 10 and at its other end with the hub 16 of the differential drum,—while the other spring 26 is connected at one end with the shaft 12 and at its other end with the hub 16 of the differential drum. These springs, therefore, form elastic connections between the differential gearing and the two shafts respectively. Under normal conditions, that is to say, when the car is traveling in a straight path, the turning of the differential gearing will cause both of the shafts 10 and 12 to turn in the same direction and at the same speed as is the usual case. When the car is turning a corner the springs do not have any such effect upon the two shafts 10, 12, as will prevent their rate of rotation from becoming automatically differentiated to the extent necessary. In other words, in the ordinary functioning of the differential mechanism, the described springs 25, 26, perform no function. If, however, for any reason, one wheel of the shafts 10, 12, is driven faster than the other,—and this may happen under the conditions hereinbefore mentioned, namely, when one wheel is on a slippery surface where it has no traction while the other wheel is on a surface where it has adequate traction, the two springs will be put under tension, and when the limit of that tension is reached the independent rotation of the two shafts is no longer possible. From that time on both shafts must rotate in substantial unison with each other and the differential gear. In any event, both shafts must be turned in the same direction in which the differential gear is being turned. It is apparent that as the springs are twisted as above described they will have a disposition to shorten; and in the construction shown they are permitted to shorten by reason of the fact that each spring is at one end made fast to a sleeve 27 which has a tongue and groove connection with the associated shaft, such that compels the sleeve to turn with the shaft but permits the sleeve to move lengthwise upon the shaft a short distance.

After the construction described has functioned in the manner above explained, the two springs will of course be left in an undesirable condition; but they will automatically tend to resume their normal conditions, and will in fact do this within a short time, because during any continuous driving in a straight line or substantially straight line there will be intermittent contact of the driving wheels with the road surface, that is to say, the wheels will be continually bounding off of the road surface; and whenever the wheels leave the road surface the associated springs will be permitted to and will move toward their normal positions. This action will be repeated with more or less rapidity, and before a great while the springs will have returned to their normal positions and conditions, and the device will be again in position to perform its ordinary functions in the ordinary way without any substantial interference or modification by the springs.

It will be understood that the omission of one of the springs 25, 26, will not prevent the mechanism from acting in substantially the described manner, because in that event the shaft with which the spring is connected will when that spring has been put under sufficient tension be compelled to rotate with this differential gear; wherefore the compensating gears can not turn on their axes and therefore the other shaft must rotate with the differential gear.

Having described my invention, I claim:—

1. In driving mechanism, the combination of two alined driven shafts, differential mechanism therebetween comprising a differential drum, compensating gears mounted thereon, and gears respectively connected with said two shafts and engaging said compensating gears, and mechanism connecting said differential drum and one of said shafts which permits said shafts to rotate to a limited extent relative to said differential drum and which, when said limit has been reached, connects together said shaft and differential drum and compels their rotation in unison.

2. In driving mechanism, the combination of two alined driven shafts, differential mechanism therebetween, and an elastic connection between one of said shafts and said differential mechanism.

3. In driving mechanism, the combination of two alined driven shafts, differential mechanism therebetween, a torsion coiled spring which embraces one of the shafts and is connected at one end to the differential mechanism and at its other end with said shaft.

4. In driving mechanism, the combination of two alined driven shafts, differential mechanism therebetween, a torsion coiled spring which surrounds the shaft and is connected at one end with the differential mechanism, and a sleeve having a sliding driving connection with said shaft with which the other end of said spring is connected.

5. In driving mechanism, the combination of two alined driven shafts, differential mechanism therebetween, and two torsion coiled springs which respectively surround said shafts each being connected at one end with the differential mechanism and at the other end with the associated shaft.

In testimony whereof, I hereunto affix my signature in the presence of two witnesses.

ALANSON P. BRUSH.

Witnesses:
OWEN M. NACKER,
THEODORE W. MARSH.